United States Patent
Takeuchi et al.

(10) Patent No.: US 7,852,314 B2
(45) Date of Patent: Dec. 14, 2010

(54) DISPLAY MEDIUM, DISPLAY DEVICE, AND DISPLAY METHOD

(75) Inventors: Takayuki Takeuchi, Ashigarakami-gun (JP); Satoshi Tatsuura, Ashigarakami-gun (JP); Kei Shimotani, Ashigarakami-gun (JP); Jun Kawahara, Minamiashigara (JP); Yasuo Yamamoto, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1059 days.

(21) Appl. No.: 11/601,732

(22) Filed: Nov. 20, 2006

(65) Prior Publication Data
US 2007/0279378 A1 Dec. 6, 2007

(30) Foreign Application Priority Data
Jun. 5, 2006 (JP) ............................. 2006-156111

(51) Int. Cl.
*G09G 3/34* (2006.01)
(52) U.S. Cl. ........................... 345/107; 345/55; 345/84; 345/105
(58) Field of Classification Search .................. 345/1.1, 345/1.2, 55, 76, 84, 105, 901, 107
See application file for complete search history.

(56) References Cited

U.S. PATENT DOCUMENTS

| 4,448,493 | A | * | 5/1984 | Matsudaira et al. | 359/268 |
|---|---|---|---|---|---|
| 6,118,573 | A | * | 9/2000 | Kubo et al. | 359/266 |
| 6,473,072 | B1 | * | 10/2002 | Comiskey et al. | 345/173 |
| 6,809,854 | B2 | * | 10/2004 | Yamamoto et al. | 359/296 |
| 6,879,424 | B2 | * | 4/2005 | Vincent et al. | 359/265 |
| 6,992,808 | B2 | * | 1/2006 | Shinozaki et al. | 359/265 |
| 7,057,789 | B2 | * | 6/2006 | Shinozaki et al. | 359/265 |
| 7,436,577 | B2 | * | 10/2008 | Moriyama et al. | 359/296 |
| 7,679,807 | B2 | * | 3/2010 | Matsubara et al. | 359/265 |
| 2003/0156314 | A1 | * | 8/2003 | Shinozaki et al. | 359/273 |
| 2005/0212741 | A1 | | 9/2005 | Schlegel | |
| 2005/0225563 | A1 | | 10/2005 | Brown Elliott et al. | |
| 2005/0225574 | A1 | | 10/2005 | Brown Elliott et al. | |

\* cited by examiner

*Primary Examiner*—My-Chau T Tran
(74) *Attorney, Agent, or Firm*—Oliff & Berridge, PLC

(57) ABSTRACT

The present invention provides a display medium including: a pair of substrates at least one of which has transparency; supporting members which partition a space between the pair of substrates into plural cells along surfaces of the substrates; metal ions which are injected into the plural cells and are deposited as metal fine particles by an electric field generated in the cells; and plural electrodes that have two or more types of electrode regions having different areas and that are provided in each of the cells on at least one of the pair of substrates.

16 Claims, 5 Drawing Sheets

DISPLAY MEDIUM, DISPLAY DEVICE, AND DISPLAY METHOD

BACKGROUND

1. Technical Field

The present invention relates to a display medium, a display device, and a display method.

2. Related Art

With the progress of high information society, the need for electronic paper systems, color display systems and large area display systems is increasing. Display technologies such as CRT, liquid crystal, EL (Electroluminescence), LED (Light Emitting Diode) and plasma displays have been developed for realizing these demands. In addition to these spontaneous emission systems, development of reflection display systems has been investigated as low electric power-consuming methods with less incompatibility to human eyes. Reflection liquid crystals have been a leading technology among the reflection display systems.

While there is a great need for a next-generation electronic paper display system, no promising technologies have been established so far. Electrophoresis methods, liquid crystal methods and OLED (Flexible Electroluminescence) methods have been considered as candidate methods.

In such a display technique, various methods are used to realize full color display. For example, in a display technique using liquid crystal or an OLED, color filters or an EL (electro-luminescent) material is used, and R, G and B are arranged at equal intervals, thereby realizing full color display. In recent years, in order to meet demands for a high-resolution image, there has been proposed a technique for reducing the widths of the color filters or the EL material in an array direction in which R, G, and B are arranged to improve the resolution.

SUMMARY

According to an aspect of the invention, there is provided a display medium comprising: a pair of substrates that are arranged opposite to each other with a gap therebetween and at least one of which has transparency; supporting members which partition a space between the pair of substrates into plural cells along surfaces of the substrates; metal ions which are injected into the plural cells and are deposited as metal fine particles by an electric field generated in the cells; and plural electrodes having two or more electrode regions with different areas that are provided in regions corresponding to each of the cells on at least one of the pair of the substrates.

BRIEF DESCRIPTION OF THE DRAWINGS

Exemplary embodiments of the present invention will be described in detail based on the following figures, wherein:

FIG. 1A is a diagram illustrating metal ions dispersed in cells, and FIG. 113 is a diagram illustrating metal fine particles deposited in the cells;

DETAILED DESCRIPTION

Figure 1A:
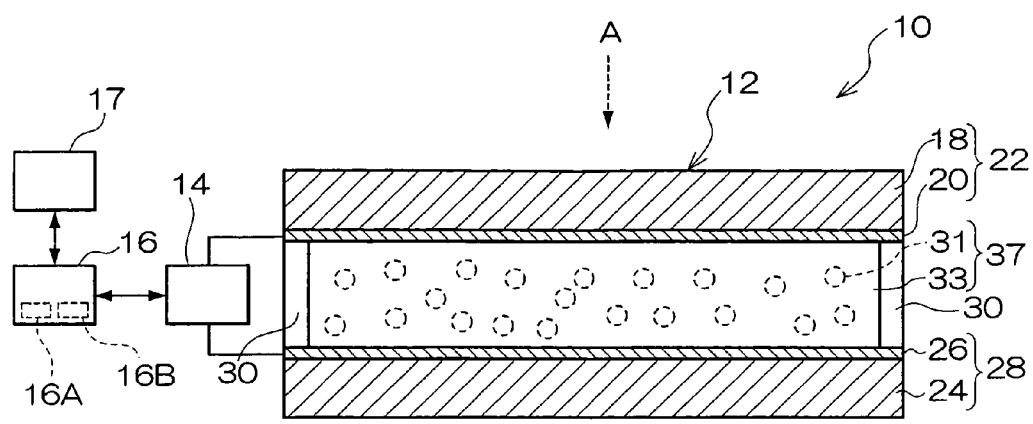
FIGS. 1A and 1B are diagrams schematically illustrating an example of a display device according to an embodiment of the invention; more specifically.

A display medium according to an embodiment of the present invention has two or more types of electrode regions having different areas in each cell provided on at least one of a pair of substrates. The electrode region indicates a region corresponding to each cell among plural electrodes provided on each of the pair of substrates. When a voltage is applied to each of plural electrodes, an electric field is generated between the electrode region of one of the pair of substrates corresponding to each cell and the electrode region of the other substrate, and metal ions in the cell are deposited to the electrode region of one of the pair of substrates as metal fine particles. Each cell is viewed as a color corresponding to the deposited metal fine particles.

Plural electrodes are linearly shaped, and are arranged in a predetermined direction along the surfaces of the pair of substrates such that the widths thereof are periodically changed.

It is preferable that the metal fine particles show a color due to surface plasmon resonance.

A display device according to an embodiment of the invention comprises a display medium and a voltage applying unit. The display medium includes: a pair of substrates which are arranged opposite to each other with a predetermined gap therebetween and at least one of which has transparency; supporting members that partition a space between the pair of substrates into plural cells along surfaces of the substrates; metal ions that are injected into each of the plural cells and are deposited as metal fine particles by an electric field generated in the cells; plural electrodes which are provided on each of the pair of substrates and each of which has two or more types of electrode regions having different areas in each of the cells provided on at least one of the pair of substrates. In this structure, the voltage applying unit applies a voltage to each of plural electrodes.

The display device may includes: an acquiring unit that acquires display data including image data of an image to be displayed on the display medium and image type information indicating the type of image; a storage unit that has the image type information and driving condition information indicating information the electrode to be supplied with a voltage among plural electrodes stored in advance therein such that these information items are associated with each other; and a control unit that controls the voltage applying unit such that a voltage is applied to the electrode indicated by the driving condition information corresponding to the image type information included in the display data, in the cell corresponding to each pixel of an image corresponding to the image data, on the basis of the image data included in the display data acquired by the acquiring unit.

The storage unit stores the image type information and the driving condition information in advance such that these information items are associated with each other. The image type information is information indicating the type of image displayed on the display medium. For example, the image type information may indicate text, an image, a mixture of text and image, and the character size of text. The driving condition information is information regarding electrodes to which a voltage will be applied among plural electrodes provided in the display medium. In the invention, the storage unit stores the image type information and the driving condition information such that, when low resolution is required according to the type of image to be displayed, from among plural electrodes a voltage is applied to only electrodes with an electrode region having a larger area in each cell, or when high resolution is required according to the type of image to be displayed, a voltage is applied to all the electrodes.

The control unit controls the voltage applying unit such that a voltage is applied to the electrode indicated by the driving condition information corresponding to the image type information included in the display data, in cells corresponding to each pixel of an image corresponding to the image data, on the basis of the image data included in the display data acquired by the acquiring unit. The voltage applying unit is controlled by the control unit to apply a voltage to the electrode indicated by the driving condition information corresponding to the image type information included in the display data, in cells corresponding to each pixel of an image corresponding to the image data.

When the voltage applying unit applies a voltage to plural electrodes, the voltage is applied to the electrode region in each cell, and then an electric field is generated between the electrode region of one of the pair of substrates and the electrode region of the other substrate, which causes metal ions in the cell to be deposited to the corresponding electrode region as metal fine particles. The deposited metal fine particles cause an image corresponding to the image data to be displayed on the display medium.

The display device according to the invention may include: an acquiring unit that acquires display data including image data of an image to be displayed on the display medium; an input unit that inputs display mode information indicating a display mode when the image is displayed; a storage unit that has the display mode information and driving condition information regarding electrodes to which a voltage will be applied among plural electrodes stored therein in advance such that these information items are associated with each other; a control unit that controls the voltage applying unit such that a voltage is applied to the electrode indicated by the driving condition information corresponding to the image mode information input by the input unit, in cells corresponding to each pixel of an image corresponding to the image data, on the basis of the image data included in the display data acquired by the acquiring unit.

The storage unit has the display mode information and the driving condition information stored therein in advance such that these information items are associated with each other. The display mode information is information indicating a display mode when an image is displayed, such as a speed priority mode giving priority to the speed, an image quality priority mode giving priority to the quality of an image, or a standard display mode for displaying an image at a predetermined resolution. The driving condition information is information regarding the electrodes to which a voltage will be applied among plural electrodes provided in the display medium. In the invention, the storage unit stores the display mode information and the driving condition information in advance such that, when low resolution is required according to the display mode, among plural electrodes a voltage is applied to only electrodes with an electrode region having a larger area in each cell, or when high resolution is required according to the display mode, a voltage is applied to all the electrodes.

The control unit controls the voltage applying unit such that a voltage is applied to the electrode indicated by the driving condition information corresponding to the display mode information input by the input unit, in cells corresponding to each pixel of an image corresponding to the image data, on the basis of the image data included in the display data acquired by the acquiring unit. The voltage applying unit applies a voltage to electrodes indicated by the driving condition information corresponding to the display mode information input by the input unit, in cells corresponding to each pixel of an image corresponding to the image data.

When the voltage applying unit applies a voltage to plural electrodes, the voltage is applied to the electrode region in each cell, and then an electric field is generated between the electrode region of one of the pair of substrates and the electrode region of the other substrate, which causes metal ions in the cell to be deposited to the corresponding electrode region as metal fine particles. The deposited metal fine particles cause an image corresponding to the image data to be displayed on the display medium.

A method of displaying an image on a display medium according to another embodiment of the invention comprises: acquiring display data including image data of the image to be displayed on the display medium and image type information indicating the type of image; storing the image type information and driving condition information indicating information regarding electrodes to which a voltage will be applied among plural electrodes in advance such that these information items are associated with each other; and applying a voltage to the electrode indicated by the driving condition information corresponding to the image type information included in the display data, in cells corresponding to each pixel of the image corresponding to the image data, on the basis of the image data included in the display data acquired in the acquiring of the display data.

Next, embodiments of the invention will be described in detail below.

As shown in FIG. 1A, a display device 10 according to an embodiment of the invention includes a display medium 12 of displaying an image, a voltage applying unit 14 for applying a voltage to the display medium 12, a control unit 16 for controlling the voltage applied from the voltage applying unit 14 to the display medium 12, and an input unit 17 for inputting various data.

The input unit 17 and the voltage applying unit 14 are connected to the control unit 16 such that they can receive/transmit signals from/to the control unit 16.

The voltage applying unit 14 applies a voltage to the display medium 12 under the control of the control unit 16. The control unit 16 includes a storage unit 16A for storing various data and a communication unit 16B for transmitting/receiving data or signals to/from an external apparatus, which will be described later. The communication unit 16B is connected between the external apparatus and the display device by wire or wireless to transmit display data including image data of the image displayed on the display medium 12 therebetween.

A user operates the input unit 17 to input information indicating the type of display when an image is displayed on the display device 10. For example, a touch panel or a keyboard is used as the input unit 17.

The display medium 12 includes a display substrate 22 that is provided in a direction X in which the display medium 12 is viewed (hereinafter, referred to as a viewing direction), a rear substrate 28 that is arranged opposite to the display substrate 22 at a predetermined gap, supporting members 30, and metal ions 31 that are injected into a space between the display substrate 22 and the rear substrate 28.

The display substrate 22 is formed by layering a linear electrode group 20 on a transparent supporting substrate 18. An insulating layer (not shown) may be formed on the linear electrode group 20. The rear substrate 28 is formed by layering a linear electrode group 26 on a supporting substrate 24.

Of the supporting substrates 18 and 24, the supporting substrate 18 forming the display substrate 22 is formed of a transparent substrate having a transmittance (visible light) of 50% or more.

When the linear electrode group 20 and the linear electrode group 26 are formed on the inner surfaces of the supporting substrate 18 and the supporting substrate 24, respectively, metal fine particles are deposited to the surfaces of the supporting substrates 18 and 24. Therefore, the supporting substrates 18 and 24 may be formed of any material as long as the material is not deteriorated or corroded by an electrolytic solution or stimulus and can stably hold metal fine particles at the same position until the metal fine particles deposited from the electrolytic solution are dissolved again.

Any of the following substrates can be used as the transparent substrate: films or plate substrates formed of polymers, such as polyester (e.g., polyethylene terephthalate), polyimide, polymethyl methacrylate, polystyrene, polypropylene, polyethylene, polyamide, nylon, polyvinyl chloride, polyvinylidene chloride, polycarbonate, polyethersulfone, a silicone resin, a polyacetal resin, a fluororesin, a cellulose derivative and a polyolefin, and inorganic substrates, such as a glass substrate. It is preferable that the transparent substrate have a light transmittance (visible light) of 50% or more.

The voltage applying unit 14 is connected to the linear electrode group 20 and the linear electrode group 26 and applies a voltage to the linear electrode groups 20 and 26 to generate an electric field in a cell 37. The linear electrode group 20 and the linear electrode group 26 may be provided on the inner surfaces of the supporting substrates 18 and 24, respectively.

Of the linear electrode group 20 and the linear electrode group 26, at least the linear electrode group 20 provided in the viewing direction X of the display medium 12 (the display substrate 22) is composed of transparent electrodes having a transmittance (visible light) of 50% or more.

More specifically, the linear electrode group 20 and the linear electrode group 26 may be formed of, for example, an oxide, such as indium, tin, cadminum, and antimony, a composite oxide, such as ITO, or an organic conducive material, such as polypyrrole and polythiophene. Preferably, the linear electrode groups 20 and 26 are formed of a metal oxide layer made of indium tin oxide (ITO), tin oxide, or zinc oxide. The linear electrode groups 20 and 26 may be composed of single layers, mixed layers, or composite layers, and may be formed by, for example, a vapor deposition method, a sputtering method, or a coating method. When the vapor deposition method or the sputtering method is used, the linear electrode groups 20 and 26 are formed to have a thickness of 100 to 2000 Å. The linear electrode groups 20 and 26 may be pattern to, for example, a matrix by a know unit for etching a liquid crystal display device or a printed circuit board.

The linear electrode groups 20 and 26 may be embedded in the supporting substrates 18 and 24, respectively. The linear electrode group 20 and the linear electrode group 26 may be separated from the display substrate 22 and the rear substrate 28, respectively, so as to be arranged outside the display medium 12.

When the linear electrode group 20 and the linear electrode group 26 are provided on the display substrate 22 and the rear substrate 28, respectively, electrodes may be damaged or the metal fine particles 39 may be attached to the electrode, which causes the leakage of signals between the electrodes. Therefore, in order to prevent the leakage, an insulating layer (not shown) may be provided on the electrodes (the linear electrode group 20 and the linear electrode group 26), if necessary. A dielectric film may be formed as the insulating layer. The dielectric film may be formed of any of the following materials: polycarbonate, polyester, polystyrene, polyimide, epoxy, polyisocyanate, polyamide, polyvinyl alcohol, polybutadiene, polymethyl methacrylate, copolymerization nylon, an ultraviolet-curable acrylic resin, and a fluororesin.

Since the dielectric film may have an effect on the characteristics of the metal ions 31, the dielectric film may be appropriately selected according to the composition of the metal ions 31.

Plural supporting members 30 are provided between the display substrate 22 and the rear substrate 28 to keep a uniform gap between the display substrate 22 and the rear substrate 28 and to partition a space between the display substrate 22 and the rear substrate 28 into plural cells 37 along the surfaces of the display substrate 22 and the rear substrate 28.

Plural supporting members 30 provided between the display substrate 22 and the rear substrate 28 can partition the space between the display substrate 22 and the rear substrate 28 into plural cells, and make it possible to prevent the overall function of the display medium 12 from being damaged even when some of the cells of the display medium 12 are damaged. The supporting members 30 can prevent an electrolytic solution 33, which will be described later, injected into the cells 37 from flowing out from the display medium 12.

Each of the cells 37 generally indicates a region surrounded by the rear substrate 28, the display substrate 22, and the supporting members 30. The region is composed of the electrolytic solution 33 including the metal ions 31 and has a function of displaying a color.

The supporting members 30 make it possible to provide one cell so as to correspond to one pixel when an image is displayed on the display medium 12. In addition, the supporting members 30 make it possible to provide each cell so as to correspond to plural pixels. From the viewpoint of high resolution, it is preferable to provide each cell so as to correspond to each pixel when an image is displayed on the display medium 12.

The supporting members 30 may be formed of a known resin material, but the material forming the supporting members 30 is not limited thereto. From the viewpoint of manufacture, it is preferable that the supporting members 30 be formed of a photosensitive resin.

It is preferable that the supporting members 30 have a small width (the length of the supporting member in a direction orthogonal to the layered direction of the display medium 12) from the viewpoint of the resolution of the display element 10. For example, preferably, the width of the supporting member 30 is in the range of 1 μm to 1 mm, but is not limited thereto.

The height of the supporting member 30, that is, the thickness of the cell 37 is appropriately determined according to the size, weight, and color forming property of the display medium 12 to be manufactured. For example, the height of the supporting member 30, that is, the thickness of the cell 37 is in the range of 1 μm to 200 μm, preferably, 3 μm to 100 μm.

The supporting members 30 may be particles. The size of the particle is preferably small, and the supporting member 30 is more particularly a monodisperse particle. The supporting members 30 may have a light color, preferably, white. The supporting members 30 may be formed of a polymer particles, silicon dioxide, or titanium oxide. The surfaces of the particles may be treated by a surface treating agent, such as a silane coupling agent or a titanate coupling agent, in order to improve the dispersibility of the particles in a solvent or to protect the particles from the solvent.

The supporting members are adhered to the two substrates by an adhesive layer (not shown). The adhesive layer may be formed of, for example, a thermosetting resin or a photocurable resin, but the material forming the adhesive layer is not limited thereto. The adhesive layer is formed of a material that does not have an effect on the material forming the supporting member 30 or components of the display medium 12, such as the electrolytic solution 33 included in the cell 37.

It is preferable that the display medium 12 according to the invention have flexibility. In this case, it is easy to use the display medium 12 according to the invention for apparatuses requiring flexibility, such as an electronic paper and a portable electronic apparatus. When the display medium 12 is used for these electronic apparatuses, it is preferable that the display substrate 22, the rear substrate 28, the supporting members 30, the linear electrode group 20, and the linear electrode group 26 may be formed of a flexible material.

Next, the electrolytic solution 33 filled into the cell 37 will be described below.

The electrolytic solution 33 is filled into the cell 37. The metal ions 31 to be deposited as metal fine particles by electric field in the cell 37 are dissolved in the electrolytic solution 33.

Figure 1B:
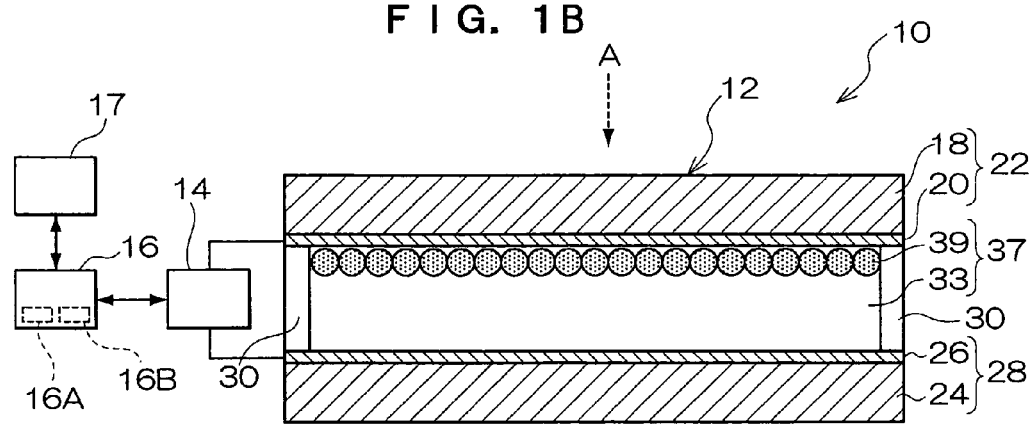

When a precipitating potential is applied to the electrolytic solution 33, the metal ions 31 shown in FIG. 1A are reduced and then deposited as the metal fine particles 39, as shown in FIG. 1B. The deposited metal fine particles 39 show color due to surface plasmon resonance. When a dissolving potential is applied, the metal fine particles 39 are oxidized and dissolved in the electrolytic solution 33 composed of the metal irons 31, as shown in FIG. 1A.

The deposition potential makes the metal ions 31 dissolved in the electrolytic solution 33 to be reduced to the metal fine particles, and the dissolving potential makes some of the deposited metal fine particles to be reduced to the metal ions 31.

The deposited metal fine particles 39 show color due to surface plasmon resonance, as described above.

The term 'show color due to surface plasmon resonance' means that the deposited metal fine particles 39 has a plasmon absorption peak in a visible light region and show a color (color forming property) corresponding to the plasmon absorption peak due to surface plasmon resonance. The term 'having the plasmon absorption peak in the visible light region' means that the deposited metal fine particle has a light absorption peak in the visible light wavelength range due to the surface plasmon resonance of the metal fine particles.

The formation of color due to the plasmon absorption appears in so-called nanoparticles having an average diameter of several nanometers to several tens of nanometers, and the particles have high chroma, transmittance, and durability. The display device 10 and the display medium 12 according to the invention perform display by using the formation of color due to the plasmon absorption. Thus, the invention can provide the display device 10 and the display medium 12 having high chroma, durability, and transmittance.

When the metal ions 31 contained in the electrolytic solution 33 according to the invention are deposited as the metal fine particles 39, the metal ions 31 have a light absorption peak due to the surface plasmon resonance of the metal fine particles in the visible light wavelength region of 400 nm to 800 nm. From this point of view, for example, any of the following metal ions may be used as the metal ions 31: gold ions, silver ions, ruthenimum ions, rhodium ions, palladium ions, osmium ions, iridium ions, platinum ions, nickel ions, iron ions, cobalt ions, zinc ions, lead ions, chrome ions, and tin ions. Since the absorption wavelength depends on the shape of the metal fine particles 39, for example, gold irons or silver ions among the above-mentioned metal ions are preferably used as the metal ions 31.

The deposited metal fine particles 39 have an average diameter of 1 to 100 nm, preferably, 2 to 50 nm to effectively exhibit the plasmon resonance. When the average diameter of the metal fine particle 39 is larger than 100 nm, the plasmon resonance may not occur. On the other hand, when the average diameter of the metal fine particle 39 is in the range of 1 to 100 nm, the metal fine particle 39 actually has a high chroma. In particular, when the average diameter of the metal fine particle 39 is in the range of 2 to 50 nm, it is possible to further improve the chroma of the metal fine particle 39. Therefore, it is possible to reduce angle-dependent visibility and thus to further improve the contrast.

The following methods can be used as a method of measuring the average diameter of the metal fine particles: a laser diffraction scattering method of radiating a laser beam onto a group of particles and analyzing an intensity distribution pattern of light diffracted and scattered from the particles to measure the average diameter of the particles; a method of measuring the average diameter of particles by analyzing the images of the particles photographed by a scanning electron microscope (SEM); and a method of directly measuring the average diameter of the particles from the images of the particles photographed by the scanning electron microscope. In the invention, the method of directly measuring the average diameter of the particles from the images of the particles photographed by the scanning electron microscope is used.

The concentration of the metal ions 31 contained in the cell 37 with respect to the total mass of ingredients filled in the cell 37 is preferably in the range of 0.0001 to 5 mol/l from the viewpoint of the stability of the electrolytic solution 33, a sufficient degree of chroma, and a response speed from when the metal ions are stimulated to when an image is displayed. However, the concentration of the metal ions 31 is not limited to the above-mentioned range, but the metal ions 31 may have any concentration at which a desired color is obtained.

The metal ions 31 contained in the electrolytic solution 33 may be obtained from a metal compound including the above-mentioned metallic materials. For example, any of the following materials can be used as the metal compound: chlorauric acid, silver nitrate, silver acetate, silver perchlorate, silver iodide, chloroplatinic acid, potassium chloroplatinate, cupric chloride, cupric acetate, and cupric sulfate. However, the metal compound is not limited thereto.

The metal ions 31 of one of the above-mentioned metallic materials can be contained in the electrolytic solution 33 filled in the cell 37 by dissolving the metal compound in the electrolytic solution 33.

The electrolytic solution 33 includes the metal ions 31 and a solvent for dissolving the metal ions 31, but is not limited thereto. For example, the electrolytic solution 33 may have various kinds of materials, if necessary.

As the solvent, water, alcohols, such as methanol, ethanol and isopropyl alcohol, and other non-aqueous solvents (organic solvents, etc.) can be used alone or in combination of two or more kinds.

Examples of the non-aqueous solvent include ethylene carbonate propylene carbonate, butylene carbonate, dimethyl carbonate, diethyl carbonate, ethylmethyl carbonate, methyl acetate, ethyl acetate, ethyl propionate, dimethylsulfoxide, γ-butyrolactone, dimethoxyethane, diethoxyethane, tetrahydrofuran formamide, dimethylformamide, diethylformamide, dimethylacetamide acetonitrile, propionitrile, methylpyrrolidine, etc, and aprotic non-aqueous solvents such as silicone oil.

The electrolytic solution 33 can contain as additives a water-soluble resin, a surfactant, electrolytic materials other than the metal ions deposited as metal fine particles, polymer particles, and metal oxide particles. That is, a material capable of dissolving the above-mentioned metal and dissolving or dispersing the electrolytic materials, the polymers, and the surfactant is selected as the solvent.

As the water-soluble resin, polymers, including polyalkylene oxide such as polyethylene oxide, polyalkylene imine such as polyethyleneimine, polyethylene sulfide, polyacrylate, polymethyl methacrylate, polyvinylidene fluoride, polycarbonate, polyacrylonitrile, and polyvinyl alcohol can be used alone or in combination of plural kinds.

It is possible to control the moving speed of metal ions in an electrolytic solution layer and to stabilize the deposited metal fine particles by dissolving or dispersing the water-soluble resin in the electrolytic solution. The amount of water-soluble resin added to the electrolytic solution may be appropriately adjusted according to the type of metal ions or in consideration of the relationship between the water-soluble resin and other additives.

The surfactant can be selected from a cationic surfactant (an alkylamine salt, a quaternary ammonium salt), a nonionic surfactant (polyoxyethylene alkylether, polyoxyalkylene alkylether, a polyoxyethylene derivative, sorbitan fatty acid ester, polyoxyethylene sorbitan fatty acid ester, polyoxyethylene sorbitol fatty acid ester, glycerin fatty acid ester, polyoxyethylene fatty acid ester, polyoxyethylene consolidation castor oil, polyoxyethylene alkylamine, alkylalkanolamide), an anionic surfactant (an alkyl sulfate ester salt, a polyoxyethylene alkylether sulfuric ester salt, alkylbenzenesulfonate, alkylnaphtalenesulfonate, alkylsulfosuccinate, alkyldiphenyletherdisulfonate, a fatty acid salt, a polycarboxylic acid type polymeric surfactant, a sodium salt of an aromatic sulfonic acid ester-formaldehyde condensate, a sodium salt of β-naphtalenesulfonate-formaldehyde condensate, etc.), an amphoteric surfactant, and the like.

By dissolving or dispersing a surfactant in the electrolytic solution, the deposited metal fine particle can be stabilized, and the volume-average particle size of the deposited metal fine particle can be regulated. More specifically, it is possible to increase the amount of surfactant to be added and decrease the volume-average particle size of the deposited metal fine particle.

It is preferable that the electrolytic solution 33 contains counter ions of the metal ions.

Any ions capable of allowing the metal ions 31 to be stably contained in the electrolytic solution 33 when no depositing voltage is applied to the electrolytic solution 33 can be used as the counter ions. For example, any of the following ions can be used as the counter ion: a fluorine ion, a chlorine ion, a bromine ion, a bromo ion, an iodine ion, a perchloric acid ion, and a fluoroborate ion. However, the counter ion is not limited thereto.

The electrolytic solution 33 may be in a gel stage. In this case, even when a portion of the display medium 12 is damaged, it is possible to prevent the electrolytic solution 33 from flowing out from the display medium 12 since the electrolytic solution 33 is in the gel state. In addition, a water-soluble resin can be used to make the electrolytic solution 33 in a gel state.

As described above, the color of the deposited metal fine particles 39 depend on a material forming the deposited metal fine particles 39 or the average diameter of the metal fine particles 39.

For example, the metal ions 31 showing red, green, or blue due to a variation in the average diameter of the deposited metal fine particles 39 are contained in the electrolytic solution 33 in the cell beforehand. In this case, when R (red), G (green), or B (blue) is displayed in each cell, for example, a voltage having a voltage application condition to deposit a metal fine particle having an average diameter corresponding to red is applied to display red (R). Similarly, a voltage having a voltage application condition to deposit a metal fine particle having an average diameter corresponding to green is applied to display green (G). Similarly, a voltage having a voltage application condition to deposit a metal fine particle having an average diameter corresponding to blue is applied to display blue (B).

This is similarly applied to display white, black, yellow (Y), magenta (M), and cyan (C). That is, a voltage having a voltage application condition to deposit a metal fine particle having an average diameter corresponding to each color is applied to display the same cell in plural colors.

The 'voltage application condition' is represented by a voltage waveform, and the level of a voltage applied to the linear electrode group 20 and the linear electrode group 26 and the time when the voltage is applied thereto are adjusted by applying the voltage represented by the voltage waveform.

Figure 2:
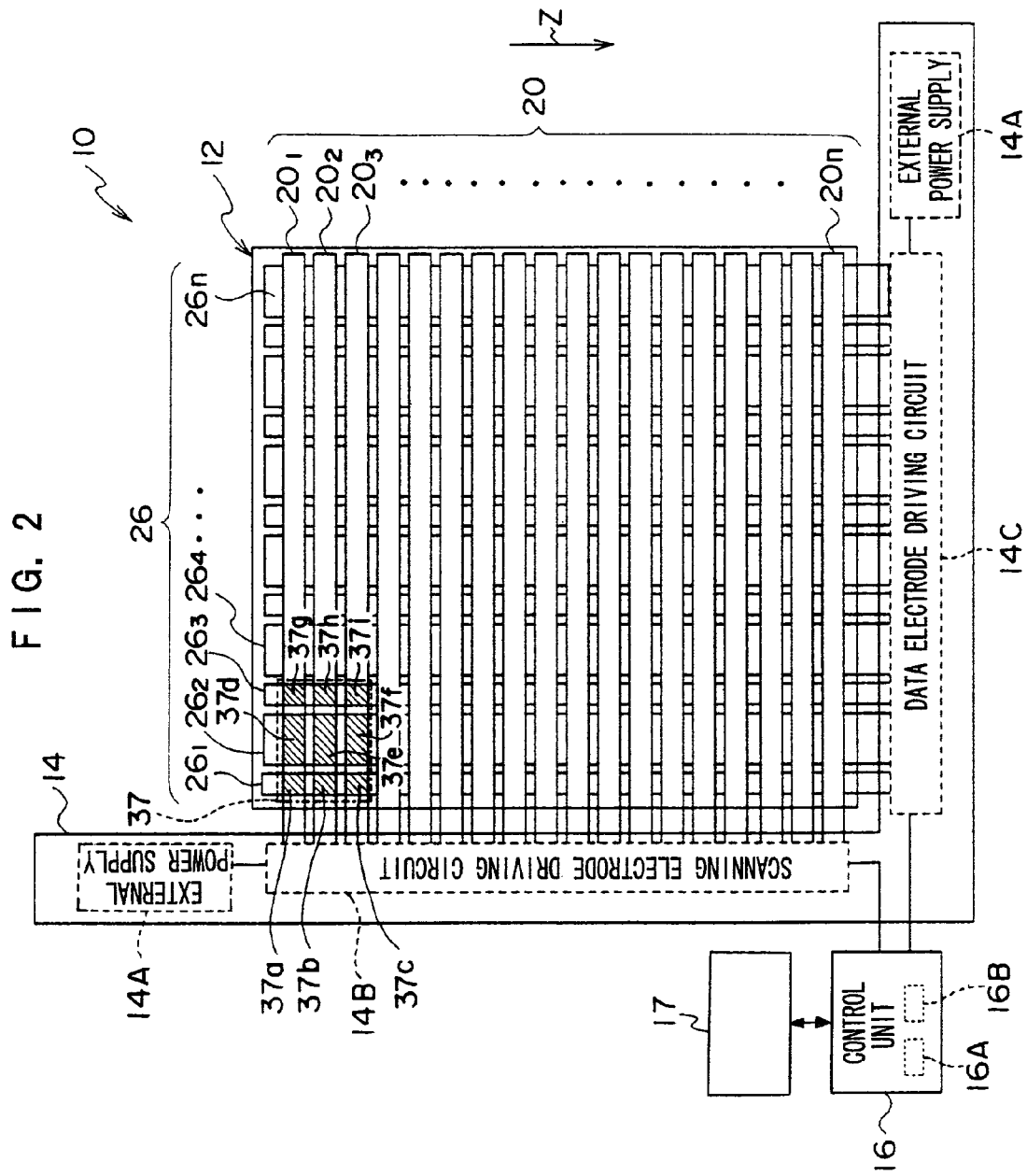
FIG. 2 is a diagram schematically illustrating the electrical structure of the display device according to the embodiment of the invention.

FIG. 2 is a block diagram illustrating an example of the electrical structure of the display device 10 according to this embodiment.

The display medium 12 has a passive matrix driving structure in which the linear electrode group 20 provided on the display substrate 22 is arranged so as to intersect the linear electrode group 26 provided on the rear substrate 28.

The voltage applying unit 14 includes a data electrode driving circuit 14C, a scanning electrode driving circuit 14B, and an external power supply 14A. The linear electrode group 26 is connected to the data electrode driving circuit 14C. The linear electrode group 20 is connected to the scanning electrode driving circuit 14B. The scanning electrode driving circuit 14B and the data electrode driving circuit 14C are connected to the control unit 16 and the external power supply 14A. The control unit 16 is connected to an image input device (not shown), and outputs signals to the data electrode driving circuit 14C and the scanning electrode driving circuit 14B on the basis of image information input from the image input device through the communication unit 16B.

In the display device 10, image writing signals (scanning signals) corresponding to linear electrodes $20_1$ to $20_n$ forming the linear electrode group 20 are transmitted from the control unit 16 to the scanning electrode driving circuit 14B, and a voltage is sequentially applied to the linear electrodes $20_1$ to $20_n$ forming the linear electrode group 20 from the scanning electrode driving circuit 14B.

At the same time, the image writing signals corresponding to the linear electrodes $20_1$ to $20_n$ to which the voltage is applied are transmitted from the control unit 16 to the data electrode driving circuit 14C in synchronization with the applying of the voltage to the linear electrodes $20_1$ to $20_n$ forming the linear electrode group 20. The data electrode driving circuit 14C applies the voltage to the entire linear electrode group 26. The scanning direction of a scanning voltage applied to the linear electrode group 20 is represented by an arrow Z. Similarly, it is possible to display a desired image on the display medium 12 by sequentially applying the voltage in the scanning direction Z.

In the display medium 12 according to this embodiment, the linear electrodes $20_1$ to $20_n$ and linear electrodes $26_1$ to $26_n$ are provided on the display substrate 22 and the rear substrate 28, respectively, such that plural electrode regions having different areas, which are parts of the linear electrodes $20_1$ to $20_n$ and $26_1$ to $26_n$, are formed in a region corresponding to each cell provided in the display medium 22 on at least one of the display substrate 22 and the rear substrate 28.

That is, a space between the display substrate 22 and the rear substrate 28 is partitioned into plural cells by plural supporting members 30. That is, each cell is a region surrounded by the display substrate 22, the rear substrate 28, and the supporting members 30. Each cell has plural electrode regions having different areas on at least one of the display substrate 22 and the rear substrate 28.

The 'electrode region' means a region positioned in each cell among the regions that are arranged along the surfaces the display substrate 22 and the rear substrate 28 and are composed of the linear electrodes $20_1$ to $20_n$ forming the linear electrode group 20 and the linear electrodes $26_1$ to $26_n$ forming the linear electrode group 26.

Therefore, in the present invention, in each cell, plural linear electrodes (for example, linear electrodes $20_1$ to $20_3$) are provided on at least one of the display substrate 22 and the rear substrate 28, and plural linear electrodes form plural types of electrode regions having different areas.

In each cell, plural types of electrode regions having different areas are formed by the linear electrodes provided on at least one of the display substrate 22 and the rear substrate 28 (for example, the linear electrodes $20_1$ to $20_3$ and/or the linear electrodes $26_1$ to $26_3$). Therefore, in this embodiment, the linear electrode group 20 and the linear electrode group 26 are provided in the display medium 12 such that the linear electrodes $20_1$ to $20_n$ and the linear electrodes $26_1$ to $26_n$ having different widths are arranged in a specific array pattern along the surfaces of the display substrate 22 and the rear substrate 28.

The 'width' means the length of each of the linear electrodes forming the linear electrode groups 20 and 26 in a direction in which the linear electrodes are arranged.

More specifically, any of the following patterns may be used as the array pattern of the linear electrodes: a pattern in which linear electrodes having a small width and linear electrodes having a large width are alternately arranged; and a pattern in which a linear electrode having a large width is periodically arranged after plural linear electrodes having a small width. In both cases, for the variation period of linear width, as one cycle of width variation in each cell, it is preferable that the width pattern varies periodically in a direction in which the linear electrodes are arranged.

A linear electrode having the smallest width among plural linear electrodes forming a cell may have the same width as when three linear electrodes form one cell.

According to the above-mentioned structure, it is possible to selectively apply a voltage to each cell of the display medium 12 by providing the linear electrode group 20 and/or the linear electrode group 26 such that as one cycle of width variation in each cell, the width pattern varies periodically in the direction in which the linear electrodes are arranged.

In recent years, in order to meet demands for a high-resolution image, a technique for reducing the widths of the linear electrodes forming the linear electrode group 26 and the linear electrode group 20 has been proposed. However, the arrangement of plural linear electrodes having a small width causes a variation in the widths of the linear electrodes, which results in the deterioration of display quality.

However, according to the invention, when linear electrodes having different widths are periodically arranged, it is possible to prevent the widths of the linear electrodes from varying at the time when the linear electrodes are arranged.

Figure 3:
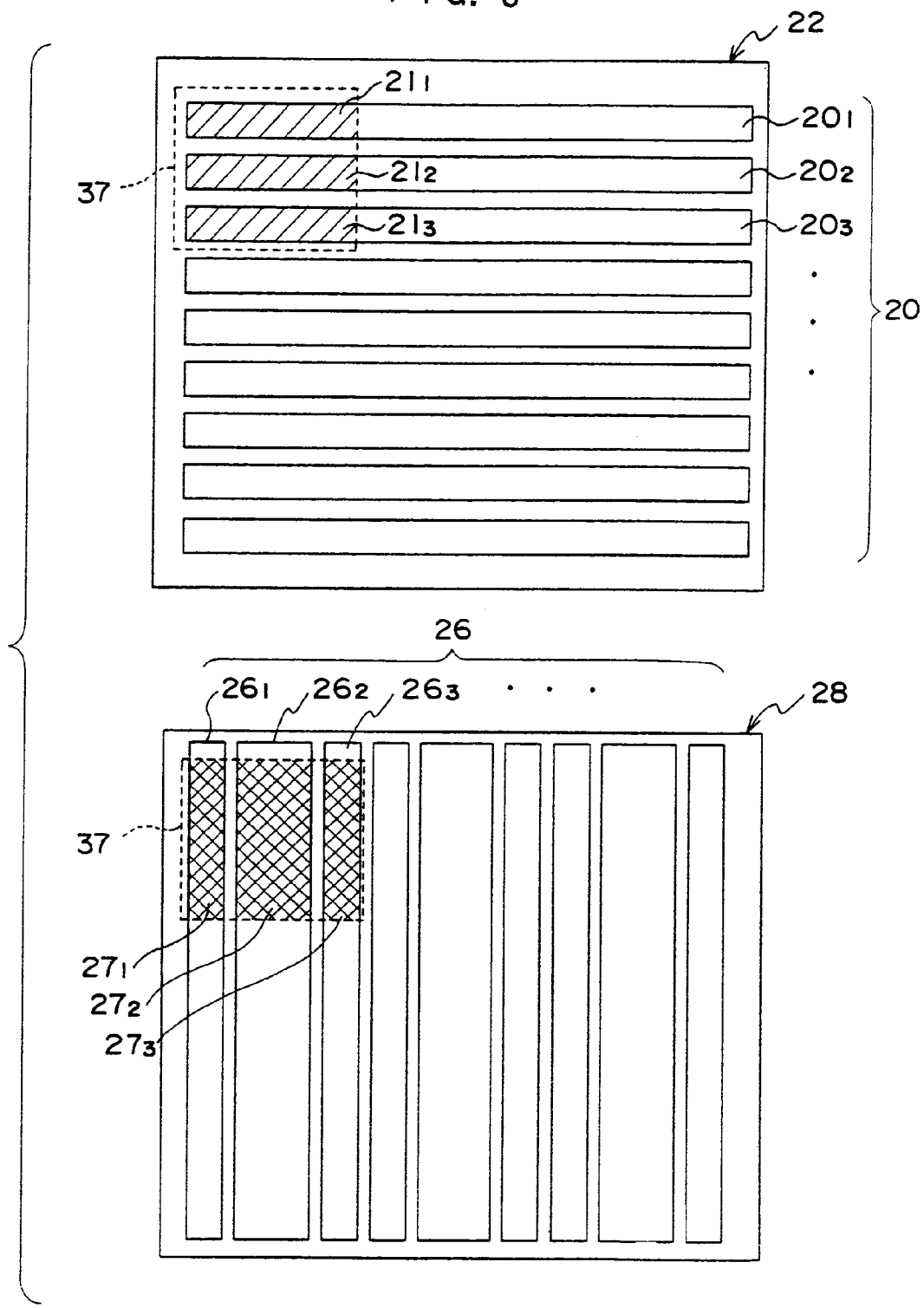
FIG. 3 is a diagram schematically illustrating the arrangement of plural electrodes of a display medium according to the embodiment of the invention.

For example, as shown in FIGS. 2 and 3, when the linear electrodes $20_1$ to $20_n$ forming the linear electrode group 20 provided on the display substrate 22 have the same width, and the widths of the linear electrodes $26_1$ to $26_n$ forming the linear electrode group 26 provided on the display substrate 28 periodically vary in the direction in which the linear electrode group is arranged, the linear electrodes $20_1$ to $20_3$ and the linear electrodes $26_1$ to $26_3$ are arranged in one cell 37 of plural cells provided in the display medium 12.

Electrode regions $21_1$ to $21_3$ forming the linear electrodes $20_1$ to $20_3$ and electrode regions $27_1$ to $27_3$ forming the linear electrodes $26_1$ to $26_3$ are provided in the cell 37.

As shown in FIG. 3, since the widths of the linear electrodes of the linear electrode group 26 periodically vary, the cell 37 has two types of electrode regions having different areas, that is, an electrode region $27_2$ having a predetermined area and electrode regions $27_1$ and $27_3$ having a smaller area than that of the electrode region $27_2$, formed therein.

Figure 4:
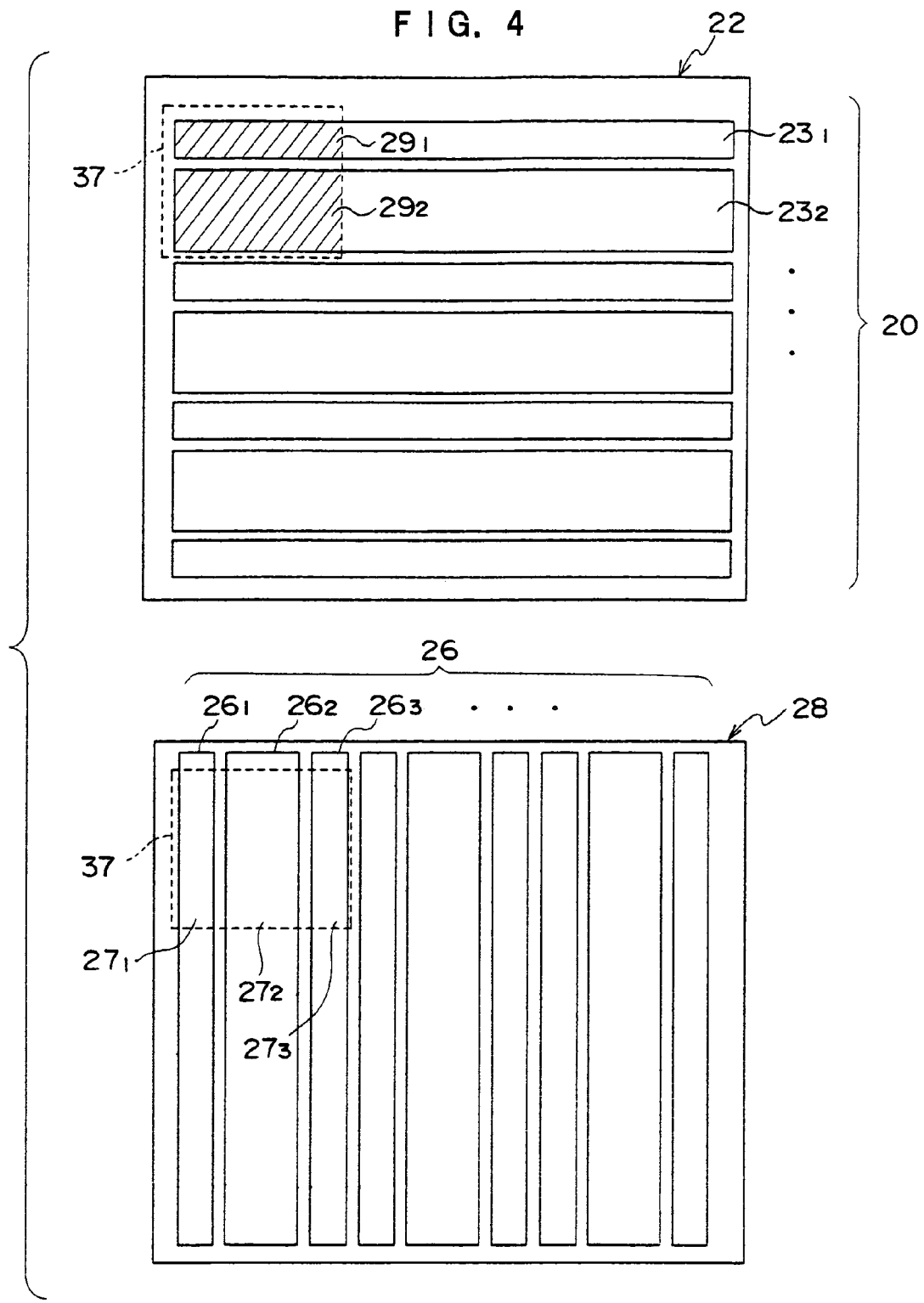
FIG. 4 is a schematically illustrating the arrangement of plural electrodes of the display medium according to the embodiment of the invention.

In FIG. 3, only the widths of the linear electrodes of the linear electrode group 20 provided on the side of the rear substrate 28 periodically vary, but the invention is not limited thereto. For example, the widths of the linear electrodes $23_1$ to $23_n$ of the linear electrode group 20 provided on the side of the display substrate 22 may also periodically vary, as shown in FIG. 4. In the structure shown in FIG. 4, the linear electrodes $23_1$ to $23_2$ and the linear electrodes $26_1$ to $26_3$ are provided in the cell 37, two types of electrode regions are provided on the rear substrate 28, and two types of electrode regions $29_1$ and $29_2$ having different areas are formed on the display substrate 22.

In the above-mentioned structure, two types of electrode regions having different areas are formed in each cell 37 on the rear substrate 28 and/or the display substrate 22, but the invention is not limited thereto. For example, three or more types of electrode regions having different areas may be formed in each cell on one of the two substrates.

When a voltage is applied to the linear electrodes $20_1$ to $20_3$ and the linear electrodes $26_1$ to $26_3$, metal ions in each cell are deposited as metal fine particles in the electrode regions on one of the display substrate 22 and the rear substrate 28. Therefore, each electrode region is viewed in a color corresponding to the metal fine particles, and thus the area of a region viewed as a color in each cell is determined by the area of the electrode region. Accordingly, a voltage is selectively applied to the linear electrodes $20_1$ to $20_n$ of the linear electrode group 20 and the linear electrodes $26_1$ to $26_n$ of the linear electrode group 26 such that an electric filed is formed in the electrode region having an area larger than a predetermined value, which makes it possible to display an image at a desired resolution in a desired region of the surface of the display substrate 22 in the display medium 12.

For the purpose of simplicity of explanation, a passive matrix structure of 18×12 electrodes is shown in FIG. 2. However, it goes without saying that, actually, the number of electrodes corresponding to the number of pixels required to display an image may be formed on each substrate (the display substrate 22 and the rear substrate 28).

In FIGS. 2 to 4, the display medium 12 is driven by a passive matrix driving method. However, the display medium 12 may be driven by an active matrix driving method. In this case, similarly, the linear electrodes may be arranged such that electrode regions having different areas are provided in a region corresponding to each cell on the display substrate 22 and/or the rear substrate 28.

Next, processes performed by the control unit 16 will be described below.

Figure 5:
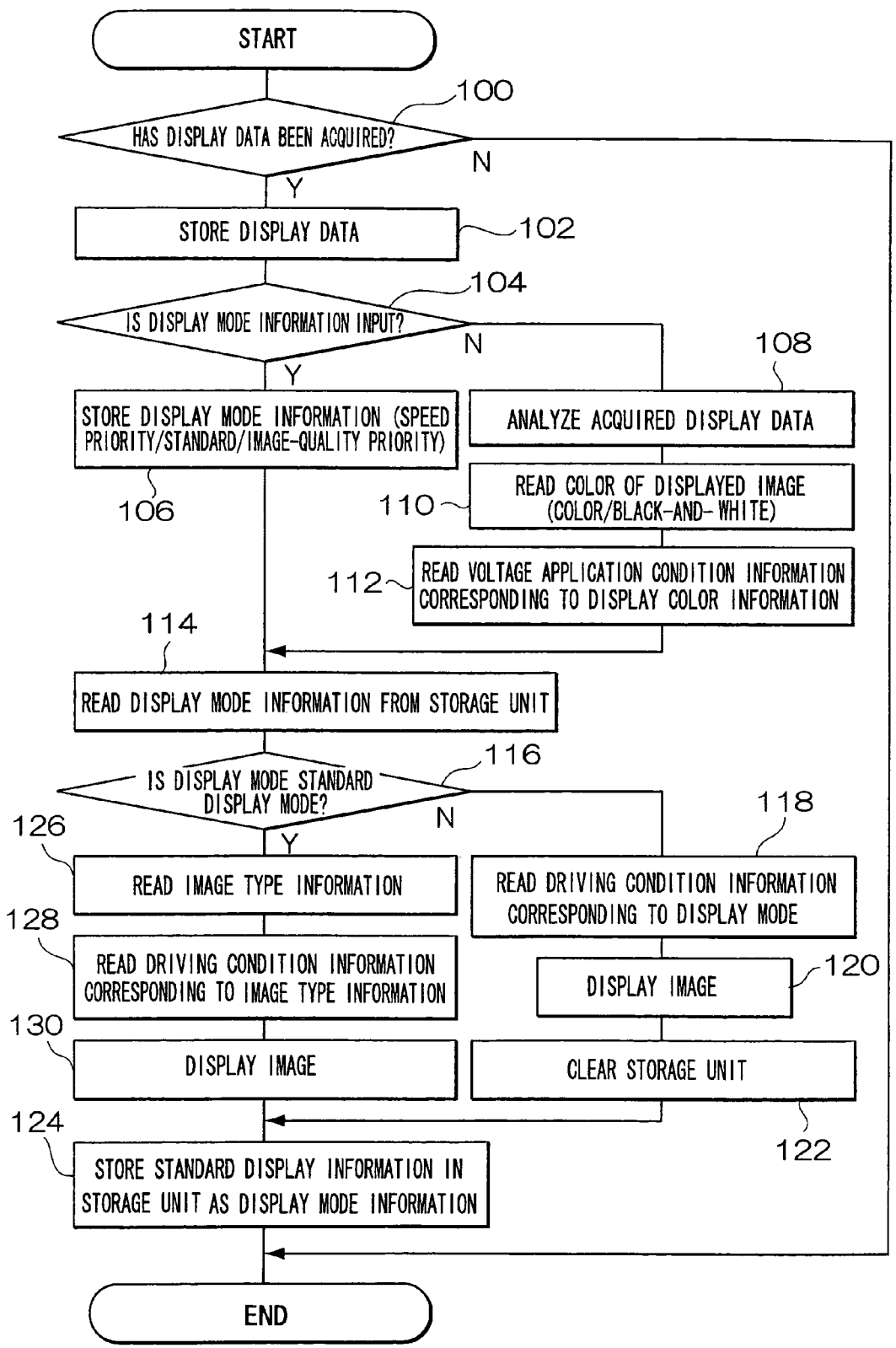
FIG. 5 is a flow chart illustrating a process performed by a control unit of the display device according to the embodiment of the invention.

A process routine shown in FIG. 5 is stored in the storage unit 16A of the control unit 16 beforehand. In addition, voltage application condition information corresponding to display color information, driving condition information corresponding to display mode information, and driving condition information corresponding to image type information are stored in the storage unit 16A beforehand.

The voltage application condition information is information indicating a voltage application condition to deposit the metal ions 31 injected in the display medium 12 as the metal fine particles 39 having an average diameter corresponding to a color when the metal ions 31 are deposited, and is also information indicating the voltage waveform.

The display color information is information indicating that a color image is displayed on the display medium 12 or a black-and-white image is displayed on the display medium 12.

The storage unit 16A has display color information indicating a color to be displayed, that is, a display color and/or voltage applied condition information corresponding to the display color stored therein beforehand.

More specifically, the voltage application condition information corresponding to the display color information indicating a black-and-white image includes voltage application information indicating a voltage application condition when white is displayed and voltage application condition information indicating a voltage application condition when black is displayed.

The voltage application condition information corresponding to the display color information indicating a color image includes voltage application condition information indicating voltage application conditions when, for example, red (R), green (G), blue (B), yellow (Y), magenta (M), cyan (C), white (W), and black (BK) are displayed.

The voltage application condition of a voltage applied to display each color may be previously measured by the display device 10, and stored so as to be associated with each display color information item.

The display mode information is information indicating a display mode. When an image is displayed on the display medium 12, the display mode information indicates which of a speed priority display mode, an image-quality priority display mode, and a standard display mode will be performed.

In the speed priority display mode, high-speed display has priority over high-quality image display. In the image-quality priority display mode, an image is displayed on the display medium 12 at the highest resolution. In the standard display mode, an image is displayed on the display medium 12 at a predetermined standard resolution.

The driving condition information is information indicating driving conditions. As shown in FIGS. 2 and 3, the driving condition information indicates which of plural linear electrodes $20_1$ to $20_n$ forming the linear electrode group 20 and plural linear electrodes $26_1$ to $26_n$ forming the linear electrode group 26 a voltage is applied.

The driving condition information includes, for example, information indicating all the linear electrodes $20_1$ to $20_n$ forming the linear electrode group 20, information indicating some of the linear electrodes $20_1$ to $20_n$ forming the linear electrode group 20 having widths smaller than a predetermined value, and information indicating some of the linear electrodes $20_1$ to $20_n$ forming the linear electrode group 20 having widths larger than the predetermined value.

In this embodiment, for the purpose of simplicity of explanation, plural linear electrodes $20_1$ to $20_n$ forming the linear electrode group 20 have the same width, and plural linear electrodes $26_1$ to $26_n$ forming the linear electrode group 26 are composed of two types of linear electrodes respectively having different widths.

Therefore, the above-mentioned three types of driving condition information items are used as the driving condition information. When plural linear electrodes $20_1$ to $20_n$ forming the linear electrode group 20 and/or plural linear electrodes $26_1$ to $26_n$ forming the linear electrode group 26 are composed of three types of linear electrodes having different widths, the number of types of widths increases, and thus the number of driving condition information items (for example, four or more types of driving condition information items) also increases. In this way, it may be possible to display an image yet more efficiently on the display device 12.

The storage unit 16A stores the display mode information and the driving condition information beforehand such that these information items are associated with each other. In this embodiment, in the storage unit 16A, the display mode information indicating the speed priority display mode is associated with the driving condition information indicating the linear electrodes having widths larger than a predetermined width among the linear electrodes $20_1$ to $20_n$ forming the linear electrode group 20. In addition, the display mode information indicating the image-quality priority display mode is associated with the driving condition information indicating all the linear electrodes $20_1$ to $20_n$ forming the linear electrode group 20. Further, the display mode information indicating the standard display mode is associated with the driving condition information indicating the linear electrodes having widths smaller than the predetermined width among the linear electrodes $20_1$ to $20_n$ forming the linear electrode group 20.

The image type information is information indicating the type of image to be displayed. In this embodiment, three types of images, that is, text having a character size larger than a predetermined value, text having a character size smaller than a predetermined value; image; and a mixture of text and an image, are exemplified.

For example, when the type of image to be displayed is text having a character size larger than a predetermined value, characters having a character size larger than a 6-point are displayed. When the type of image to be displayed is text having a character size smaller than the predetermined value, characters having a character size smaller than a 6-point are displayed.

When the type of image to be displayed is the image, for example, an image such as photo image is displayed.

When the type of image to be displayed is the mixture of text and an image, for example, a mixture of an image, such as a photograph or a figure, and text, such as characters, is displayed.

The storage unit 16A stores the image type information and driving condition information beforehand such that these information items are associated with each other. In this embodiment, in the storage unit 16A, the image type information indicating the text having a character size larger than the predetermined value is associated with the driving condition information indicating the linear electrodes having widths larger than a predetermined width among the linear electrodes $20_1$ to $20_n$ forming the linear electrode group 20.

In addition, in the storage unit 16A, the image type information indicating the text having a character size smaller than the predetermined value and the image type information indicating the mixture of text and an image are associated with the driving condition information indicating the linear electrodes having widths smaller than a predetermined width among the linear electrodes $20_1$ to $20_n$ forming the linear electrode group 20.

Further, the image type information indicating an image is associated with the driving condition information indicating all the linear electrodes $20_1$ to $20_n$ forming the linear electrode group 20.

The control unit 16 performs the process routine shown in FIG. 5 in at a predetermined interval or according to user's instructions.

A user may operate the input unit 17 to input a signal indicating a display instruction. When it is determined that the signal indicating a display instruction is input, the control unit 16 may perform the process routine shown in FIG. 5.

In step 100, it is determined whether display data is acquired through the communication unit 16B.

More specifically, in step 100, it is determined whether display data including image data of an image to be displayed on the display medium 12 is input from an external device (not shown) through the communication unit 16B.

The display data includes image data of an image, such as a text, a figure, or a photograph displayed on the display medium 12, and various processing instructions.

In step 102, the display data acquired in step 100 is stored in the storage unit 16A.

In step 104, it is determined whether display mode information indicating the display mode of an image to be displayed on the display medium 12 is input through the input unit 17.

In step 104, the user operates the input unit 17 to input the display mode information.

When it is determined in step 104 that the display mode information is input, the process proceeds to step 106 to store information indicating the display mode input in step 104, that is, any one of the speed priority display information, the standard display information, and the image-quality priority display information in the storage unit 16A. Thereafter, the process proceeds to step 114, which will be described later.

When it is determined in step 104 that the display mode information is not input, the process sequentially proceeds to steps 100 and 108.

In step 108, the display data stored in the storage unit 16A in step 102 is analyzed, and the image data and various processing instructions included in the display data are analyzed.

In step 110, it is determined whether an image to be displayed on the display medium 12 is a black-and-white image or a color image by using display color information of the image, on the basis of the result analyzed in step 108.

The process of step 110 may be performed by determining whether black-and-white display information indicating black-and-white display or color display information indicating color display is input through the input unit 17.

In step 112, voltage application condition information corresponding to the display color information read in step 110 is read out from the storage unit 16A.

For example, when the image to be displayed on the display medium 12 is a black-and-white image and the display color information read in step 110 indicates a black-and-white image, voltage application condition corresponding to the black-and-white image information indicating the black-and-white image is read out from the storage unit 16A. When the image to be displayed on the display medium 12 is a color image and the display color information read in step 110 indicates a color image, voltage application condition corresponding to the color image information indicating the color image is read out from the storage unit 16A.

In step 114, display mode information indicating the display mode stored in the storage unit 16A by the process in step 106 or the process in step 124, which will be described later, is read out from the storage unit 16A.

In step 116, it is determined whether the display mode information read in step 114 is information indicating the standard display mode. When it is determined that the read display mode information is not the information indicating the standard display mode, that is, when the read display mode information is information indicating the speed priority display mode or information indicating the image-quality priority display mode, the process proceeds to step 118.

In step 118, driving condition information corresponding to the display mode information read in step 114 is read out from the storage unit 16A.

For example, when the display mode information read in step 114 indicates the speed priority display mode, information indicating the linear electrodes having widths larger than a predetermined width among the linear electrodes $20_1$ to $20_n$ forming the linear electrode group 20 is read as the driving condition information.

When the display mode information read in step 114 indicates the image-quality priority display mode, information indicating all the linear electrodes $20_1$ to $20_n$ forming the linear electrode group 20 is read as the driving condition information.

In step 120, an image corresponding to the image data included in the display data that is stored in the storage unit 16A in step 102 is displayed on the display medium 12 on the basis of the read driving condition information and voltage application condition information.

More specifically, in step 120, the linear electrodes indicated by the driving condition information read in step 118 are set as linear electrodes to be supplied with a voltage, and a voltage having a voltage waveform indicated by the voltage application condition information read in step 112 is applied to the linear electrodes that are set as the linear electrodes to be supplied with a voltage.

Next, the voltage having the voltage waveform is applied to the set linear electrodes such that a color corresponding to each pixel is displayed in the cell corresponding to each pixel of an image corresponding to the image data, on the basis of the image data included in the display data stored in the storage unit 16A in step 102.

Therefore, the voltage having the voltage waveform set as the voltage application condition is applied to the electrode regions of the linear electrodes having widths indicated by the driving condition among the electrode regions of plural linear electrodes corresponding to each cell that corresponds to each pixel of the image displayed on the display medium 12, on the basis of the image data.

In step 122, the display mode information and the display data stored in the storage unit 16A are cleared, and the process proceeds to step 124 to store standard display information indicating the standard display mode in the storage unit 16A. Then, the routine ends.

On the other hand, when it is determined in step 116 that the display mode information read in the storage unit 16A in step 114 is the information indicating the standard display mode, the process proceeds to step 126 to read out image type information of an image corresponding to the image data included in the display data that is stored in the storage unit 16A in step 102.

In step 126, the image type information may be read according to the result obtained by analyzing the display data in step 108.

In step 128, driving condition information corresponding to the image type information read in step 126 is read out from the storage unit 16A.

For example, when the image type information read in step 126 is information indicating text having a character size larger than a predetermined value, information indicating the linear electrodes having widths larger than a predetermined width among the linear electrodes $20_1$ to $20_n$ forming the linear electrode group 20 is read as the driving condition information.

For example, when the image type information read in step 126 is information indicating text having a character size smaller than a predetermined value or information indicating a mixture of text and an image, information indicating the linear electrodes having widths smaller than a predetermined width among the linear electrodes $20_1$ to $20_n$ forming the linear electrode group 20 is read as the driving condition information.

For example, when the image type information read in step 126 indicates an image, information indicating all the linear electrodes 20, to 20, forming the linear electrode group 20 is read as the driving condition information.

In step 130, an image corresponding to the image data included in the display data that is stored in the storage unit 16A in step 102 is displayed on the display medium 12 on the basis of the read driving condition information and voltage application condition information.

More specifically, in step 130, the linear electrodes indicated by the driving condition information read in step 128 are set as linear electrodes to be supplied with a voltage, and a voltage having a voltage waveform indicated by the voltage application condition information read in step 112 is applied to the linear electrodes that are set as the linear electrodes to be supplied with a voltage.

Next, the voltage having the voltage waveform is applied to the set linear electrodes such that a color corresponding to each pixel is displayed in the cell corresponding to each pixel of an image corresponding to the image data, on the basis of the image data included in the display data that is stored in the storage unit 16A in step 102.

Therefore, the voltage having the voltage waveform set as the voltage application condition is applied to the electrode regions of the linear electrodes having widths indicated by the driving condition among the electrode regions of plural linear electrodes corresponding to each cell that corresponds to each pixel of the image displayed on the display medium 12, on the basis of the image data.

In step 130, an image is displayed on the display medium 12, and the process proceeds to step 124 to store the standard display information indicating the standard display mode in the storage unit 16A as the display mode information. Then, the routine ends.

As an image needs to have higher resolution, information indicating all the linear electrodes having different widths may be stored as driving condition information corresponding to the image type information. As an image needs to have lower resolution, information indicating only the linear electrodes having a large width may be stored as driving condition information. When an image needs to be displayed at intermediate resolution between high resolution and low resolution, information indicating only the linear electrodes having a small width may be stored as driving condition information. However, the invention is not limited to the correspondence between the type of image and the linear electrodes.

For example, in this embodiment, the driving condition information indicating all the linear electrodes $20_1$ to $20_n$ forming the linear electrode group 20 is stored so as to be associated with the image type information indicating an image. Alternatively, information indicating the resolution of an image may be stored as the image type information beforehand. In this case, when the resolution is lower than a predetermined resolution, information indicating only the linear electrodes having a large width may be stored as the driving condition information. When the resolution is equal to or higher than the predetermined resolution and is lower than specified resolution that is higher than the predetermined resolution, information indicating only the linear electrodes having a small width may be stored as the driving condition information. When the resolution is higher than the specified resolution, information indicating all the linear electrodes $20_1$ to $20_n$ may be stored as the driving condition information so as to be associated with the image type information.

In this case, in step 126, the image type information including information indicating the resolution of an image is read out. In step 128, driving condition information corresponding to the read image type information indicating the resolution of an image is read out. In step 130, a voltage based on the driving condition of the read driving condition information is applied to the linear electrode group 20 and the linear electrode group 26. In this way, it is possible to perform detailed control.

As described above, according to the display device 10 according to the invention, a voltage is applied to electrodes according to the type of an image to display an image on the display medium 12. Therefore, when an image needs to have high resolution, a voltage is applied to all the linear electrodes, and when an image needs to have low resolution, a voltage is applied to only the linear electrode with the electrode region having a large area in each cell, which makes it possible to arbitrarily change the resolution according to the type of an image. Thus, it is possible to display an image at arbitrary resolution.

According to the display device 10 according to the invention, a voltage is applied to the electrodes according to the display mode to display an image on the display medium 12. Therefore, when an image needs to have high resolution, a voltage is applied to all the linear electrodes, and when an image needs to have low resolution, a voltage is applied to only the linear electrode with the electrode region having a large area in each cell, which makes it possible to arbitrarily change the resolution according to the image type. Thus, it is possible to display an image at arbitrary resolution.

More specifically, when a high-speed display mode is given priority and when an image to be displayed has low resolution or the image does not need to have high resolution, the linear electrodes having a smaller width of the linear electrode group 20 and the linear electrode group 26 are set as linear electrodes to which a voltage will be applied on the basis of the type or the display mode of the image to be displayed on the display medium 12. In contrast, when a high-quality display mode has priority over the high-speed display mode and when an image to be displayed has high resolution or the image needs to have high resolution, all the linear electrodes of the linear electrode group 20 and the linear electrode group 26 are set as linear electrodes to which a voltage will be applied on the basis of the type or the display mode of the image to be displayed on the display medium 12.

Therefore, it is possible to change the display speed or resolution of an image displayed on the display medium 12 according to the type or the display mode of the image to be displayed.

Further, it is possible to adjust a voltage application condition to apply a voltage to the linear electrodes on the basis of whether the image displayed on the display medium is a color image or a black-and-white image. Thus, it is possible to effectively apply a voltage having a necessary level to the linear electrodes for a predetermined time.

According to an aspect of the invention, plural electrodes with two or more types of electrode regions having different areas are provided in a region corresponding to each cell provided on at least one of a pair of substrates of the display medium. Therefore, it is possible to provide a display medium, a display device, and a display method capable of displaying an image at arbitrary resolution.

What is claimed is:

1. A display medium comprising:
   a pair of substrates that are arranged opposite to each other with a gap therebetween and at least one of the substrates having transparency;
   supporting members that partition a space between the pair of substrates into a plurality of cells along surfaces of the substrates;
   metal ions that are injected into the plurality of cells and are deposited as metal fine particles by an electric field generated in the cells; and
   a plurality of electrodes provided on each of the pair of substrates,
   wherein, on at least one of the substrates, a region corresponding to each of the cells includes two or more types of electrode regions with different areas, each of the regions being defined by an array of horizontal and vertical electrodes overlapping each other, at least either the vertical electrodes or the horizontal electrodes having two or more types of width.

2. The display medium according to claim 1,
   wherein the plurality of electrodes are linearly shaped, and are arranged in a predetermined direction along the surfaces of the pair of substrates such that widths of the plurality of electrodes periodically vary.

3. The display medium according to claim 1,
   wherein the region forms a pattern of a variation of widths of the electrodes over one cell, the pattern being repeated in a direction in which the linear electrodes are arranged.

4. The display medium according to claim 1,
   wherein the display medium is driven by a passive matrix driving method.

5. The display medium according to claim 1,
   wherein the display medium is driven by an active matrix driving method.

6. The display medium according to claim 1,
   wherein the metal fine particles show a color due to surface plasmon.

7. The display medium according to claim 1,
   wherein the metal fine particles have an average diameter of from 1 to 100 nm.

8. The display medium according to claim 1,
   wherein the concentration of the metal ions with respect to the total mass of ingredients filled into the cells is in a range of 0.0001 to 5 mol/l.

9. The display medium according to claim 1,
   wherein the metal fine particles that are deposited are formed of different materials and have different average diameters.

10. The display medium according to claim 1,
    wherein an electrolytic solution is filled into the cells, and counter ions of the metal ions are contained in the electrolytic solution.

11. The display medium according to claim 1,
    wherein the electrolytic solution is in a gel state.

12. A display device comprising:
    the display medium of claim 1; and
    a voltage applying unit that applies a voltage to each of the plurality of electrodes.

13. The display device according to claim 12,
    wherein the plurality of electrodes have linear shapes, and are arranged in a predetermined direction along the surfaces of the pair of substrates such that widths thereof periodically vary.

14. The display device according to claim 12,
    wherein the metal fine particles show a color due to surface plasmon.

15. The display device according to claim 12, further comprising:
    an acquiring unit that acquires display data including image data of an image to be displayed on the display medium and image type information indicating a type of image;
    a storage unit that stores in advance the image type information and driving condition information indicating which electrodes of the plurality of electrodes are to be supplied with the voltage, such that the image type information and the driving condition information are associated with each other; and
    a control unit that controls the voltage applying unit such that the voltage is applied to the electrodes indicated by the driving condition information corresponding to the image type information included in the display data, in cells corresponding to each pixel of the image that corresponds to the image data, on the basis of the image data included in the display data acquired by the acquiring unit.

16. The display device according to claim 12, further comprising:
    an acquiring unit that acquires display data including image data of an image to be displayed on the display medium;
    an input unit that inputs display mode information indicating an image display mode;
    a storage unit that stores in advance the display mode information and driving condition information indicating which electrodes of the plurality of electrodes are to be applied with the voltage among a plurality of electrodes, such that the display mode information and the driving condition information are associated with each other; and
    a control unit that controls the voltage applying unit such that the voltage is applied to the electrodes indicated by the driving condition information corresponding to the display mode information input through the input unit, in cells corresponding to each pixel of the image that corresponds to the image data, on the basis of the image data included in the display data acquired by the acquiring unit.

* * * * *